Feb. 28, 1967   R. MEES ETAL   3,306,698
MARKING DEVICE FOR MOTION PICTURE FILM
Filed June 25, 1964   5 Sheets-Sheet 3

INVENTORS
ROBERT MEES
HERIBERT LÜSSEM
WERNER HOLLE

By Toulmin & Toulmin
Attorneys

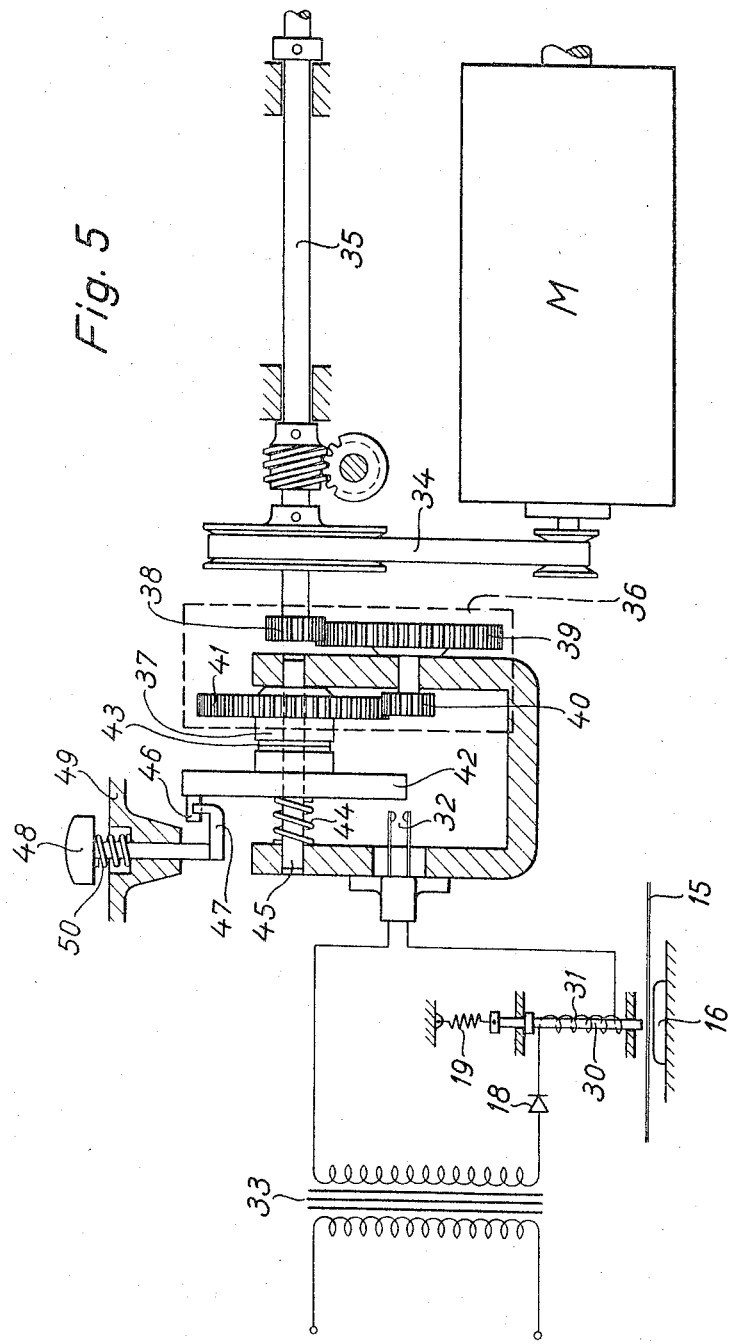

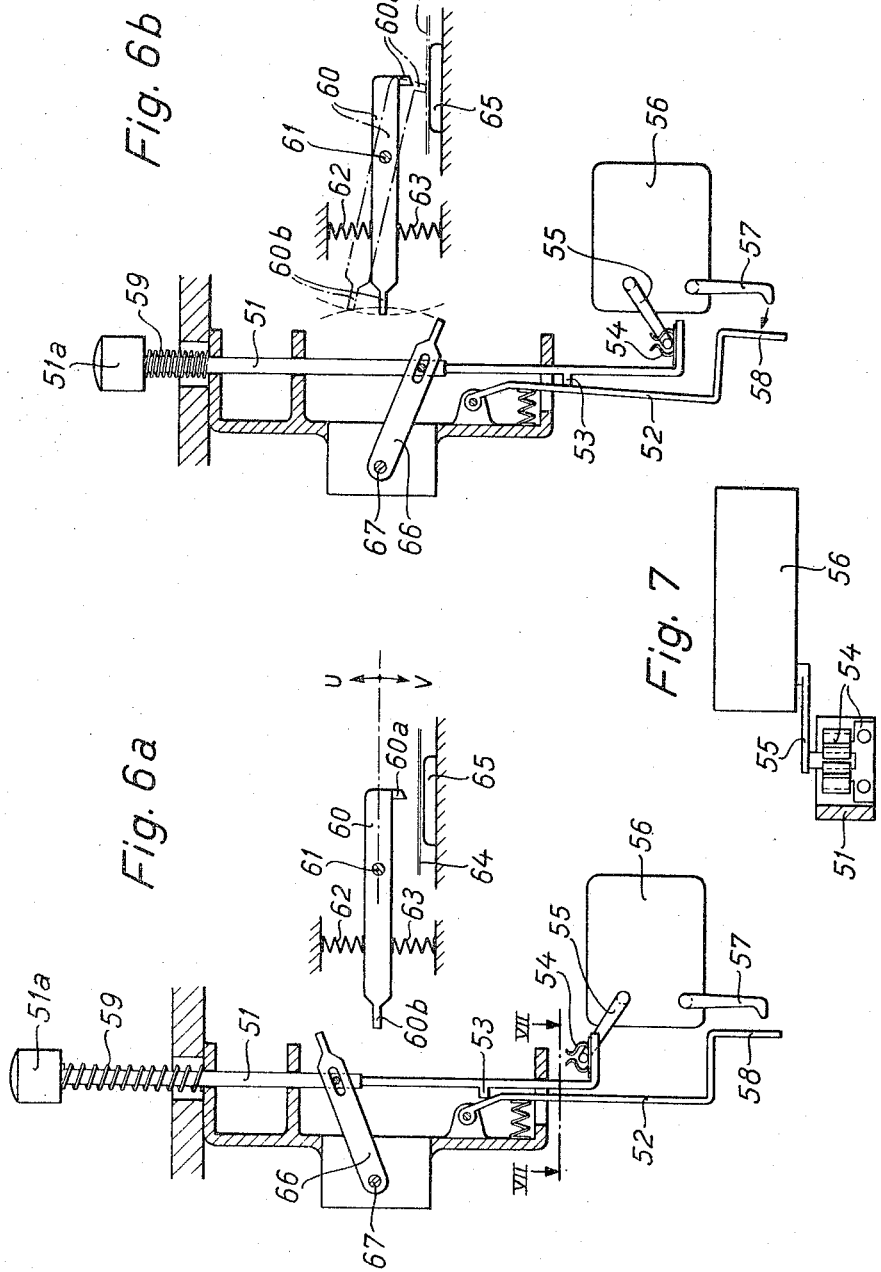

3,306,698
MARKING DEVICE FOR MOTION
PICTURE FILM
Robert Mees, Wissmar, Kreis Wetzlar, and Heribert Lussem and Werner Holle, Wetzlar, Germany, assignors to Ernst Leitz G.m.b.H., Wetzlar, Germany
Filed June 25, 1964, Ser. No. 377,935
Claims priority, application Germany, July 19, 1963, L 45,405
19 Claims. (Cl. 352—130)

This invention relates to a device for use on motion picture film projectors for marking individual pictures of the film, especially in connection with narrow films for amateur use.

Motion picture films, after being exposed and developed, are generally cut into sections so that the different scenes can be arranged in their proper order and/or to remove undesirable portions. The compiler can inspect the film in a special viewing apparatus where the film is allowed to run to the place where the cut is to be made, whereupon the viewing apparatus is stopped, the film taken out, the cutting performed, and the film then returned to the apparatus for continuing the viewing.

If such a special viewing apparatus is not available, which is usually the case with most amateurs because of the high cost thereof, then the film must be viewed with an ordinary projector. This, however, does not permit the film to be taken out in as simple a manner as from the viewing apparatus. The compiler can, therefore, do the cutting most efficiently only by viewing it during its normal projection and noting those places where a cutting appears to be necesary. The cuts themselves can then be made only during the rewinding of the film. This noting and subsequent cutting is an uncertain and inconvenient procedure.

Devices have been mounted on the projector for marking the places to be cut. Such a marking device consists of a small stamp positioned immediately adjacent the picture window perpendicular to the plane of the film and actuated by a Bowden wire or the like. When the cable knot is pressed, the stamp punches a small mark on the film at exactly the level of the picture that is at the window. The compiler will then not need to remember the pictures to be cut because he can mark such pictures directly.

One disadvantage of this procedure is that the film can be marked only while it is standing still because the film at the window moves with a velocity of about four meters per second and it is very unlikely that the punch operator would be able to mark a picture at exactly the instant when it is at a standstill. The film must therefore be stopped in the projector so that it can be marked by pressing the button. This stopping, marking and restarting of the projector is inconvenient and time-consuming, so that a technical problem is presented of producing a marking device which makes it possible to apply the marks during the continued running of the film.

In the present invention this problem is solved by mounting a marker along the path of the film between the last driving sprocket and the rewinding spool, the marker being provided with a retarding device between the actuating means and the marking implement, with the retardation period being equal to the time it takes for the film to move from the picture window to the marker. If the projector is also equipped for sound reproduction, then the marker according to this invention is positioned behind the sound take-off and between the latter and the wind-up spool.

The basic idea of this invention is that the command for marking the film is to be given at the instant when the picture to be marked is cast upon the screen, while the command is not to be executed immediately but is to be stored for delayed execution until the picture has moved from the film gate to the place where the marker is located.

For various reasons it is no longer necessary at that place to provide means for stopping the film. First of all the film at that place does not move rearwardly with the high maximum velocity of four meters per second as in the neighborhood of the picture window, but only with a slow and uniform velocity of about 6.8 centimeters per second. Furthermore, the momentary stoppage of the film which occurs while the punch is in operation is of no consequence in this position of the film; first, because the stoppage is of only very short duration and; second, because the subsequent wind-up spool is connected with the wind-up shaft by a friction coupling so that a momentary stoppage of the film can only cause a slight slipping of the wind-up spool on its shaft.

For this reason it is advisable to position the film marker adjacent that portion of the film which is between the last film advancing sprocket and the wind-up spool, because if the marking device would be positioned ahead of a sprocket wheel, then even a short stopping of the film would injure the perforations. It is, however, to be observed that the retardation time can be shortened in proportion to the closeness of the marker to the last drive sprocket. If, however, the marker were to be positioned before such a sprocket, then the time during which the punch is in operation would have to be extremely short in order not to injure the perforations along the film.

The specific mechanism by which the principle of this invention can be put into practice can assume many forms. The marker of this invention consists, basically, of a stamping device which is actuated either mechanically or electromagnetically to punch into the margin of the film a small notch or hole or otherwise to mark the film.

The retardation device can be either mechanical or electrical in operation. Among the electrical devices suitable for this purpose are those in which the retardation is effected by a relay with electromagnetically or thermally controlled delayed action, or in which the delay is controlled by an electronically timed circuit.

Especially suitable are devices which are driven by the projector motor and in which the delay is proportional to the rate of movement of the film, fluctuations of motor speed being then automatically compensated.

The retardation must be timed in such a manner that the picture which is to be marked will be able to move from the picture window to the region of the marker during the retardation time. The time therefore depends on the length of the film path between the picture window and the marker, and on the speed of travel of the film. Since the film may travel at various speeds (e.g. 16, 18 or 24 pictures per second), it is advantageous to provide the retarding mechanism with a device whereby the retardation time can be varied. For this purpose, especially in electronic circuits, variable resistances can be used, whereas in mechanical systems corresponding variable elements can be used.

The length of the film path from the picture window to the marker includes also the lower loop of the film. Since the latter can be of different lengths, the path of the film may also be of different lengths. Care should therefore be taken during insertion of the film to have the lower loop always of the same length. This is easily taken care of because in most of the projectors which do not thread the film automatically, the form of the loop is printed, embossed or otherwise marked on the projector case so that during the threading of the film it will be necessary only to follow the guide-line to keep the length of the loop constant. With projectors which thread the film automatically, even this precaution is not necessary because the machine will of its own accord keep the length of the loop constant.

In commercial projectors for narrow films the required retardation time is about three to five seconds. During this retardation time it is not ordinarily possible to send another impulse to the marker, but the marker will be able to receive another impulse only after the first one has been executed. The minimum interval between successive impulses is, therefore, three to five seconds.

If it becomes necessary to shorten the time intervals between successive commands, as in the case of large projectors with long time intervals, then such shortening can be accomplished by providing the marker with a plurality of delaying devices. The simplest and most satisfactory method of doing this is by actuating the marker electromagnetically and to delay its acuation either by delayed action relays or by electronic timing circuits. In these systems, any desired number of relay circuits or electronic timing circuits can be arranged in parallel so that there will be as many contacts as there are circuits. By such multiplication of delay devices and their actuating means it becomes possible to give successive commands as close together as desired for transmission to the marker in their proper order.

These and other objects and advantages of this invention will become more apparent upon reference to the following specification taken in connection with the accompanying drawings, in which:

FIGURE 2 is a schematic view of a circuit for a marker with electromagnetic actuation and a thermally controlled delay action relay;

FIGURE 5 shows schematically an electromagnetically actuated marker with a mechanically actuated retarding mechanism driven by the projector motor;

FIGURES 6a and 6b show schematically a marking device with a mechanically actuated marker and a retardation mechanism in which the delay time is controlled by two functional positions of a spring actuated retarder;

FIGURE 7 is a section through FIGURE 6a at the level VII—VII showing the clamping of the tensioning member of the retarding mechanism to the pusher bar of the push button;

Figure 1:
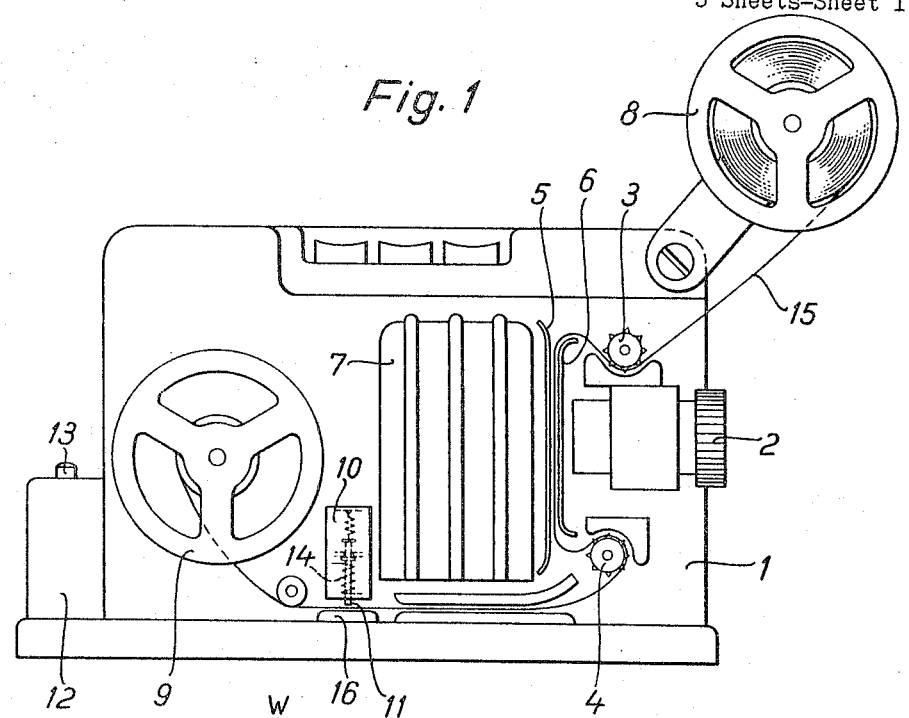
FIGURE 1 is a motion picture projector in side elevation with the marker mounted adjacent the path of the film, together with a housing containing the delaying and actuating means.

In FIGURE 1 is shown a narrow film movie projector 1 of conventional construction with an objective 2, upper and lower drive sprockets or transport rolls 3 and 4, a film guideway 5 with a picture window plate 6, a lamp housing 7 and the supply and take-up spools 8 and 9.

The projector also contains a film marking device positioned near the wind-up spool 9 and comprising a film marker 11 in a housing together with a retardation mechanism contained in the housing 12 and actuated by the button 13.

The film marker 11 is formed as an armature in a solenoid 14 so as to form therewith an electromagnet but, in the absence of any electrical current, is partly withdrawn from the solenoid by spring pressure. Upon closing the circuit, the magnetic force overpowers the spring pressure and draws the marker down into the solenoid. The lower end of the marker then strikes upon the film 15, which is guided between the marker and the stamping plate 16. The marker 11 deforms the film at the place of impact so as to mark the adjacent picture.

Figure 2:
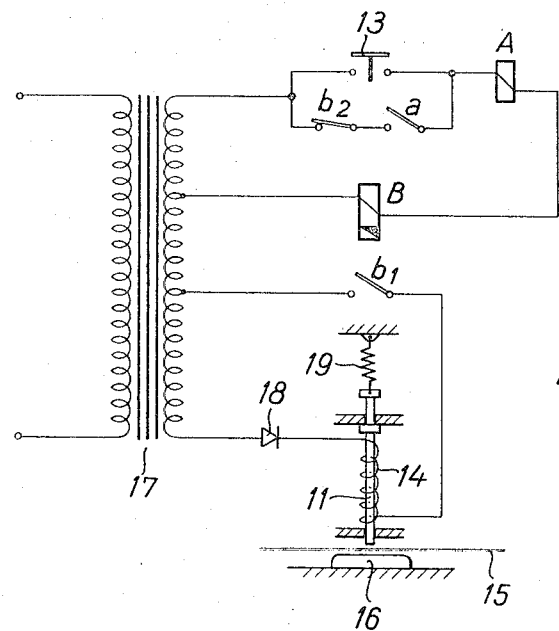
FIGURE 2 is a schematic view of a marker with electromagnetically acuation and a thermally controlled delayed action relay.

The flow of current through solenoid 14 is controlled by the retardation system in the housing 12, the electric circuit thereof being shown in FIGURE 2. In this system there are two separate electric circuits on the secondary side of a transformer 17 which can be the transformer that is normally present in a movie projector.

One of these circuits includes the solenoid 14 with its marker 11 and has a contact $b_1$ and a rectifier 18 in series with it. The second circuit contains a thermally delayed starting relay B, another relay A and an actuating button 13, all in series, the button 13 having two serially connected contacts $a$ and $b_2$ in parallel with it. This circuit forms the real retardation circuit, the delay time being determined by the relay B.

The circuit is closed by depressing the button 13, causing relay A to be actuated to close the contact $a$. The circuit then keeps itself closed, only a momentary impulse from the button 13 having been necessary to put the marking mechanism into operation.

After a thermally controlled time of delay, equal to the time it takes the film 15 to move from the picture window to beneath the marker 11, the relay B will come into action to actuate the contacts $b_1$ and $b_2$. The contact $b_1$ will then close the circuit of the marker 11 which will be drawn into the solenoid 14 against the tension of the spring 19 so as to impress its mark on the film 15. At the same time the closed contact $b_2$ will be opened by the relay B so as to interrupt the two-relay circuit. Both relays will then be de-energized so that the contact $b_1$ will spring open, thereby interrupting the current through solenoid 14 which has been energized only momentarily to cause the marker 11 to make only one quick reciprocation, its withdrawal being promptly effected by the spring 19. The time during which the marker 11 acts upon the film 15 is therefore extremely short, thus not causing any appreciable stoppage of the film.

Figure 3:
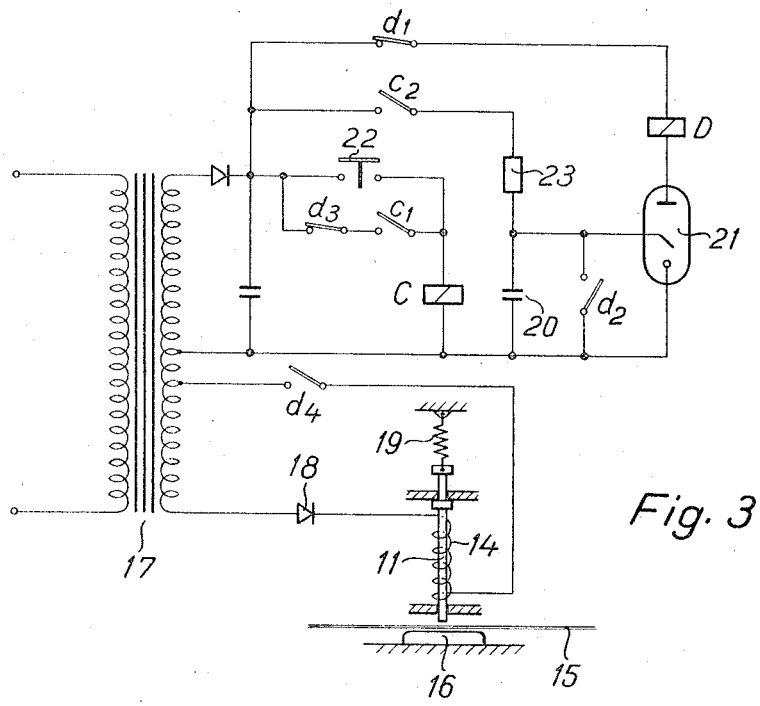
FIGURE 3 is a schematic view of a circuit for a marker with electromagnetic acuation in which the retardation is controlled by an electronically controlled timing circuit.

FIGURE 3 shows the circuit diagram of a marking device in which the circuit of the marker is the same as in FIGURE 2 except that the retardation is not effected by relays but by electronic controls. The delay time is determined in a known manner by the time required for charging a capacitor 20 through a serially connected resistor 23, to which a cold cathode thyratron 21 is connected in parallel. The thyratron also has in parallel therewith an actuating button 22 and a relay C so that, by analogy to the circuit in FIGURE 2, the button 22 will be bridged over by a circuit closed by the relay C. The thyratron 21 has in series with it a relay D which responds to the firing of the thyratron.

When an impulse is given by pressing the button 22, the relay C is actuated to close the circuit by-passing the button 22 by means of the contact $c_1$. At the same time relay $c$, by closing contact $c_2$, will apply a voltage to the resistor 23 to charge the capacitor 20. After a certain charging time the capacitor will be charged, whereupon the thyratron 21 will be ignited and energize the relay D to actuate the contacts $d_1$ to $d_4$ so as to close the contact $d_4$ in the circuit of the marker 11 and cause the latter to mark the film in the same manner as in FIGURE 2. At the same time the normally closed contacts $d_1$ and $d_3$ will be opened so that the bridging circuit by-passing the button 22 will be opened to disconnect relay C. The contact $c_2$ will then spring open to de-energize the thyratron 21 and its relay D, causing the contacts $d_1$ to $d_4$ to resume their original positions. The contact $d_2$ was also closed by the relay D to short-circuit the capacitor 20 to completely discharge the latter in preparation for the next delay timing, but it springs open again when the relay became de-energized.

Also in the retardation circuit of FIGURE 3 the marker circuit will be energized only momentarily so that the marker will make only an instantaneous contact with the film.

Figure 4:
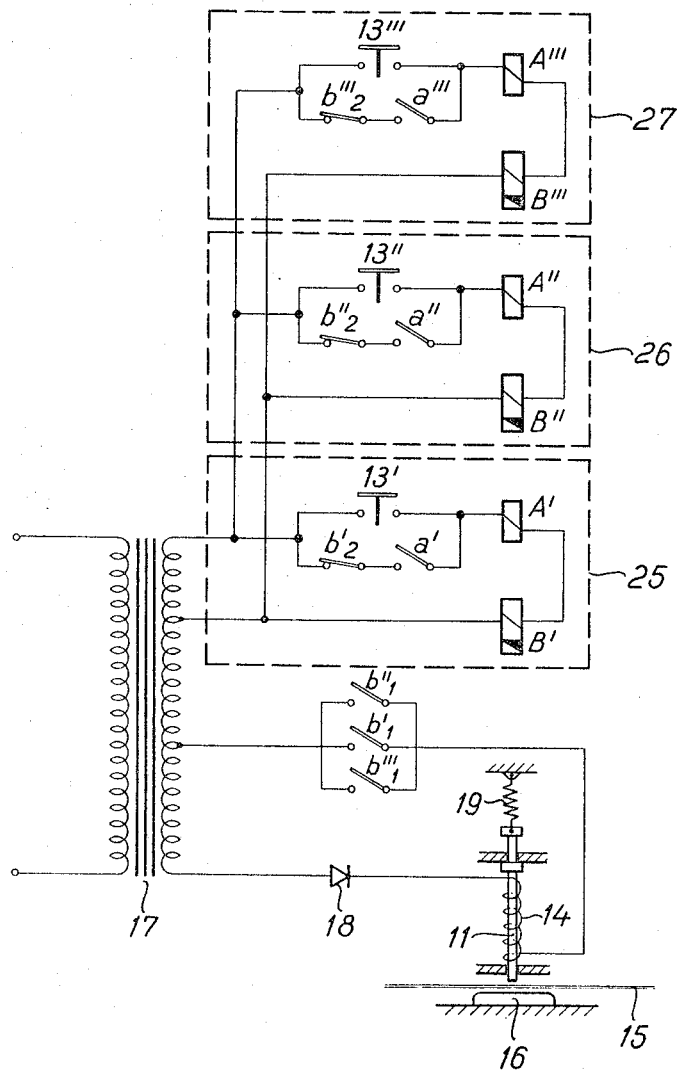
FIGURE 4 shows schematically an electromatically actuated marker in a circuit comprising several retardation devices.

FIGURE 4 shows in principle the same circuit as in FIGURE 2, the only difference being in the delay system with its plurality of actuating buttons in parallel circuits which have been enclosed in dotted rectangles 25, 26 and 27 for clarity. Circuit 25 contains relays A', B' and button 13'. Similarly the circuit 26 has relays A", B" and button 13", while circuit 27 has relays A''', B''', and button 13'''.

The marker portion of the circuit of FIGURE 4 has three contacts $b_1'$, $b_1''$, $b_1'''$ in parallel which are closed by their respective relays B', B", B'''. The delay systems in these circuits function in the same manner as explained under FIGURE 2. By arranging several of these retardation circuits in parallel, it is possible for the operator, after having given one command by depressing one of buttons 13', 13" or 13''', but before it is executed, to give two additional commands, by successively depressing the others of the said buttons, all of which commands will then be executed in their correct order. Obviously any number of retardation circuits could be arranged in parallel in the same manner as the three shown in FIGURE 4.

FIGURE 5 shows a mechanically operated marking apparatus. Although in this example the marker 30 with its solenoid 31 also forms an electromagnet that is connected to a series with the terminals 32 to the secondary of a transformer 33, so that the marker here also would be actuated electromagnetically, the retardation mechanism in this case is however actuated mechanically by the projector motor M.

The belt 34 is driven by the motor M to drive the main shaft 35 of the projector. The shaft 35 is connected to reduction gearing 36 for rotating a disc 37. The gearing 36 is shown as comprising gear wheels 38–41, but can be of any desired type.

Another disc 42 is actuated by disc 43 through a friction clutch 43, engaged by a spring 44, so as to be rotated from the shaft 35 while the motor is in operation. The disc 42 which is loosely mounted on its shaft 45 is prevented from rotating during its resting position by a lug 46 in whose path is positioned an abutment 47 which is operatively connected with an actuating button 48 which is kept in a resting position outside the housing wall 49 by a spring 50.

By depressing the button 48 abutment 47 releases lug 46 so that the disc 42 can be rotated by motor M through the main shaft 35, reduction gearing 36 and friction clutch 43.

The lug 46, at a predetermined point in its travel, will engage the contacts 32 so as to close momentarily the contacts 32 which will cause the film marker to be actuated in the manner already described. After completing its revolution the lug 46 will again encounter the abutment 47 which, in the meantime, has been permitted to return to its original position by release of the button 48.

In this modification the period of free movement of the lug 48 from the time when the button is pressed until the time when the contact 32 is closed corresponds to the delay time. The reduction gearing 36 and the position of the contact 32 are so proportioned and adjusted that the duration of this free movement will correspond to the time a picture takes to move from the picture window to the marker. The specific advantage of this modification consists in that changes in the velocity of the film, which may be caused by variations of motor speed or by slipping of the main drive belt 34, will not result in the wrong picture getting marked because the speed of the disc 42 and the duration of free movement of the lug 46 will be changed proportionately.

Still another form of this invention is shown in FIGURES 6a, 6b and 7 which differs from the previous modifications in that both the marker and the retarding device are operated in a purely mechanical manner.

A pusher bar 51 is brought into working position by depressing the push button 51a, the bar being then held in that position by a retaining plate 52 moving in behind the shoulder 53 on the plate 52. The free end of the bar 51 carries a spring clip 54 by means of which the bar 51 is detachably connected to the tensioning lever 55 of a mechanical retardation device 56. This connection becomes disengaged when, after the tensioning lever has been brought to the limit of its movement, the bar 51 is further depressed while the plate 52 moves behind the shoulder 53.

After the tensioning lever has been released it will return slowly to its original position, its return movement being retarded by escapement mechanism of known construction contained in the housing 56. When the tensioning lever 55 comes to the end of its return movement it releases the actuating lever 57 for clockwise movement (FIGURE 6b) against the offset end of plate 52 to cause the latter to disengage the shoulder 53 so as to release the bar 51 from its depressed position. The spring 59 will then cause the bar 51 to jump into its original position where it will again become connected to the tensioning lever 55 by means of the spring clip 54.

The above described elements constitute the actuating and retarding mechanism of the marking apparatus which is shown in its resting position in FIGURE 6a and in its working position in FIGURE 6b. The downward movement of bar 51 serves to set the retardation mechanism for a new timing cycle.

The marker in this modification consists of a double ended lever 60 pivoted on an axis 61 and kept in its middle position by two similar springs 62, 63. One end of the lever is in the form of a stamp 60a whose resting position is immediately above the film 64, directly over the stamping plate 65. The other end 60b of the lever 60 extends into the swinging path of a single ended lever 66 that is pivoted on an axis 67 and coupled with the pusher bar 51 in such a manner that its free end will be swung through a short arc during every movement of the bar. During each of these swinging movements it will strike upon the end 60b of the lever 60, carrying the latter with it as long as the two arcuate paths overlap each other. During downward movement of the bar 51 the stamp 60a will therefore be moved upwardly in the direction of the arrow U away from the film, but upon disengagement of the lever ends 66 and 60b from each other the stamp will be returned to its mid-position by the springs 62, 63.

During the backward jump of the bar 51 the lever 66 will encounter the arm 60b from below so as to swing the marker 60 downwardly in the direction of the arrow V, causing the marker to impinge upon the film 64 and stamping plate 65, thereby marking the film in the desired plate and then, after disengagement of the lever ends from each other, returning to the mid-position.

In this modification the delay time is from the release of the tensioning lever 55 and during the disengagement of the retaining plate 52, until the stamp 60a strikes upon the film. The delay time is determined mainly by the operation of the retardation device 56 which consists of a known type of escapement mechanism, for example.

Figure 8:
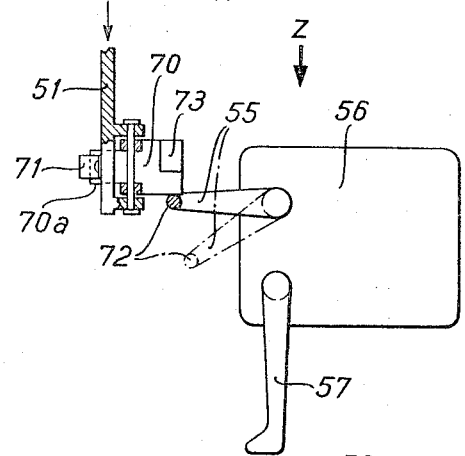
FIGURE 8 shows another form of disengageable connection between the tensioning member of the retarding mechanism and the pusher bar of the push button.
Figure 9:
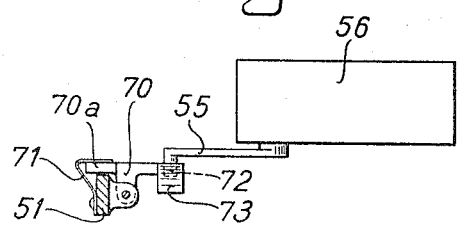
FIGURE 9 is a view of the FIGURE 8 arrangement looking in the direction of the arrow Z.

FIGURES 8 and 9 show another kind of coupling device for connecting the pusher bar 51 with the tensioning lever 55. The bar 51 has a plate 70 pivotally connected to it and kept in operative position by a spring 71 engaging a lug 70a so as to permit the plate to swing in only one direction. The plate 70 cooperates with a pin 72 on the tensioning lever 55 and is shown in FIGURE 8 in its resting position over this pin. When the bar 51 is depressed in the direction of the arrow W it will take the pin with it and will release it when the tensioning lever 55, at the end of its swinging movement, has moved out of the path of the plate 70, which together with the bar 51 will continue in its downward movement in the direction of the arrow W.

When the rod 51 is released by operation of actuating lever 57, and the rod springs back, the inclined surface 73 of the plate 70 will encounter the free end of the pin 72 so as to be swung laterally thereby to permit the plate 70 to be deflected thereby. The spring 71 will return the plate 70 to its operating position after the plate passes pin 72 so that when the rod 51 is again depressed it will carry the tensioning lever 55 with it by engagement of the pin by the plate 70.

It will be understood that this invention is susceptible to modifications in order to adapt it to different usages and conditions; and accordingly, it is desired to comprehend such modifications within this invention as may fall within the scope of the appended claims.

What is claimed is:

1. In combination; a motion picture projector having a lens system through which the film passes and film take up means spaced from said lens system and operable for receiving the film after it passes through said lens system, and a film marking device for the film supported between said lens system and said take up means and through which the film passes in traveling from said lens system to said take up means, said marking device for the film comprising; a support plate over which the film is movable, a marking punch adjacent said plate and normally retracted from the plate to leave a space through which a film is movable, drive means for driving said punch toward a film on said plate to mark the said film, and means for actuating said drive means including a manually operable element and time delay means operatively connecting said manually operable element with said drive means whereby the marking of a film occurs a predetermined time after operation of said manually operable element.

2. The combination according to claim 1 which includes means for varying the delay period of said time delay means.

3. In combination; a motion picture projector having a take-up spool for taking up film, a projecting lens system through which the film passes, and drive sprockets on opposite sides of said lens system for driving the film therethrough, and a film marking device on the projector through which the film passes located between said take-up spool and the one of said sprockets nearest thereto and operable when actuated to mark the film at the point thereof in the marking device, said film marking device including manually operable means for initiating a marking operation and time delay means operatively connecting said manually operable means with said marking device whereby the marking of a film by the marking device occurs a predetermined time after operation of said manually operable means.

4. The combination according to claim 3 which includes means for varying the delay period of said time delay means.

5. The combination according to claim 3 in which the delay between operation of said manually operable means and the actuation of said marking device is about equal to the time required for a point on the film to travel from said lens system to said marking device.

6. The combination according to claim 4 in which said projector includes a sound reproducing unit located between said marking device and the said one of said sprockets nearest thereto.

7. The combination according to claim 5 in which said time delay means includes a plurality of individual time delay units in parallel and connected in controlling relation to said marking device, said manually operable means including a manually operable control element for each said time delay unit.

8. The combination according to claim 7 in which each time delay unit comprises a relay, and each relay having a blade connected in controlling relation to said marking device.

9. In combination; a motion picture projector having a lens system through which the film passes and film take up means spaced from said lens system and operable for receiving the film after it passes through said lens system, and a film marking device for the film supported between said lens system and said take up means and through which the film passes in traveling from said lens system to said take up means, said marking device for the film comprising; a support plate over which the film is movable, a marking punch adjacent said plate and normally retracted from the plate to leave a space through which film is movable, drive means for driving said punch toward a film on said plate to mark the said film, and means for actuating said drive means including a manually operable element and time delay means operatively connecting said manually operable element with said drive means whereby the marking of a film occurs a predetermined time after operation of said manually operable element, said drive means comprising an electromagnetic actuator energizable for actuating said punch, a first relay controlling said electromagnetic actuator, and a second time delay relay controlling said first relay and itself under the control of said manually operable means.

10. The combination according to claim 9 in which said time delay relay includes thermal means for effecting the time delay.

11. The combination according to claim 9 in which said time delay relay includes electronic means for effecting the time delay.

12. The combination according to claim 9 in which said time delay relay includes an electronic element operable when conductive to actuate said first relay, a control member for said electronic element responsive to a predetermined voltage to make said electronic element conductive, and a resistance-capacitor network connected to said control member and controlled by said manually operable means.

13. In combination; a motion picture projector having a take-up spool for taking up film, a projecting lens system through which the film passes, and drive sprockets on opposite sides of said lens system for driving the film therethrough, and a film marking device on the projector through which the film passes located between said take-up spool and the one of said sprockets nearest thereto and operable when actuated to mark the film at the point thereof in the marking device, said film marking device including manually operable means for initiating a marking operation and time delay means operatively connecting said manually operable means with said marking device whereby the marking of a film by the marking device occurs a predetermined time after operation of said manually operable means, said projector including a drive motor, said time delay means comprising contacts actuatable for causing operation of said marking device, a member having a driving connection with said motor operable for actuating said contacts when moved a predetermined distance from a rest position by said motor, and said manually operable means comprising a stop element normally holding said member in said rest position and operable when actuated for releasing said member from said rest position.

14. The combination according to claim 13 in which said driving connection includes an impositive driving connection and reduction gearing between said motor and said member.

15. In combination; a motion picture projector having a take-up spool for taking up film, a projecting lens system through which the film passes, and drive sprockets on opposite sides of said lens system for driving the film therethrough, and a film marking device on the projector through which the film passes located between said take-up spool and the one of said sprockets nearest thereto and operable when actuated to mark the film at the point thereof in the marking device, said film marking device including manually operable means for initiating a marking operation and time delay means operatively connecting said manually operable means with said marking device whereby the marking of a film by the marking device occurs a predetermined time after operation of said manually operable means, said time delay means including a mechanical time delay device, said manually operable means comprising an element operable for initiating a cycle of said time delay device, and means operated by the time delay device at the expiration of the time delay period thereof operable for actuating said marking device.

16. In combination; a motion picture projector having a take-up spool for taking up film, a projecting lens system through which the film passes, and drive sprockets on opposite sides of said lens system for driving the film therethrough, and a film marking device on the projector through which the film passes located between said take-up spool and the one of said sprockets nearest thereto and operable when actuated to mark the film at the point thereof in the marking device, said film marking device including manually operable means for initiating a marking operation and time delay means operatively connecting said manually operable means with said marking device whereby the marking of a film by the marking device occurs a predetermined time after operation of said manually operable means, said time delay means comprising a mechanical timer, said manually operable means comprising a push rod spring urged in the retracting direction and manually movable in the advancing direction, said push rod when manually moved in the advancing direction being operable for initiating a cycle of said timer, means latching said push rod in advanced position, means operated by the timer at the expiration of its cycle for unlatching said push rod, and means operated by the push rod during its retracting movement for actuating said marking device.

17. The combination according to claim 16 in which said means for actuating said marking device comprises a lever pivoted between its ends and having one end operatively associated with the marking device and its other end adjacent said push rod, and a pin on the push rod to actuate said lever in effective direction during retracting movement of said push rod.

18. In combination; a motion picture projector having a take-up spool for taking up film, a projecting lens system through which the film passes, and drive sprockets on opposite sides of said lens system for driving the film therethrough, and a film marking device on the projector through which the film passes located between said take-up spool and the one of said sprockets nearest thereto and operable when actuated to mark the film at the point thereof in the marking device, said film marking device including manually operable means for initiating a marking operation and time delay means operatively connecting said manually operable means with said marking device whereby the marking of a film by the marking device occurs a predetermined time after operation of said manually operable means, said time delay means comprising a mechanical timer, said manually operable means comprising a push rod spring urged in the retracting direction and manually operable in the advancing direction, said timer having a setting lever and an actuating lever, means on the push rod operable during advancing movement of the push rod to engage and move said setting lever to initiate a cycle of said timer, means to latch said push rod in advanced position, means operated by said actuating lever at the end of the time cycle to release said push rod, and means operated by the push rod during its retracting movement for actuating said marking device.

19. The combination according to claim 18 in which said means on the push rod is a plate pivoted thereto and drivingly engageable with said setting lever during advancing movement of said push rod while camming idly by said setting lever during retracting movement of the push rod.

References Cited by the Examiner

UNITED STATES PATENTS

| | | | |
|---|---|---|---|
| 1,960,061 | 5/1934 | Morsbach | 352—169 |
| 2,906,167 | 9/1959 | Castedello et al. | 352—129 |
| 3,148,573 | 9/1964 | Bender | 83—235 |
| 3,212,399 | 10/1965 | Walter | 352—92 X |

JULIA E. COINER, *Primary Examiner.*